United States Patent
Steffler et al.

(10) Patent No.: US 12,497,194 B2
(45) Date of Patent: Dec. 16, 2025

(54) AIRCRAFT MONITORING SYSTEM

(71) Applicant: General Electric Company, Schenectady, NY (US)

(72) Inventors: David J. Steffler, Caledonia, MI (US); Jonathan P. VanStensel, Grand Rapids, MI (US); David Straight, Caledonia, MI (US); Brian R. Johnson, Ada, MI (US); Juan Carlos Arenas Mena, El Marques (MX); Laura Rodriguez, Miami, FL (US)

(73) Assignee: General Electric Company, Evendale, OH (US)

( * ) Notice: Subject to any disclaimer, the term of this patent is extended or adjusted under 35 U.S.C. 154(b) by 85 days.

(21) Appl. No.: 18/478,270

(22) Filed: Sep. 29, 2023

(65) Prior Publication Data
US 2025/0108936 A1    Apr. 3, 2025

(51) Int. Cl.
*B64F 5/60*   (2017.01)
*H04L 12/40*  (2006.01)

(52) U.S. Cl.
CPC ............ *B64F 5/60* (2017.01); *H04L 12/40* (2013.01); *H04L 2012/4028* (2013.01)

(58) Field of Classification Search
CPC ... B64D 2045/0085; B64F 5/60; G06F 21/85; G06F 21/552; G06F 21/606; G06F 2221/2101; G06F 2221/2105; G06F 2221/2141; H04L 12/40; H04L 12/40006;
(Continued)

(56) References Cited

U.S. PATENT DOCUMENTS

| | | |
|---|---|---|
| 6,411,173 B1 | 6/2002 | Eddy et al. |
| 7,009,996 B1 | 3/2006 | Eddy et al. |
| 9,063,800 B2 | 6/2015 | McCready |

(Continued)

FOREIGN PATENT DOCUMENTS

CA    3013586 A1 *   3/2019   ............... B64F 5/60

OTHER PUBLICATIONS

WO 2021063785 A1 with English translation; date filed Sep. 24, 2020; date published Apr. 8, 2021. (Year: 2021).*

(Continued)

*Primary Examiner* — Calvin Cheung
(74) *Attorney, Agent, or Firm* — Enang Akan; Darrow Mustafa PC

(57) ABSTRACT

An aircraft monitoring system includes an avionics communication bus structure, at least one network member user device that transmits a broadcast message onto the avionics communication bus structure, and at least one non-member user device that receives the broadcast message transmitted onto the avionics communication bus, processes the received broadcast message, and transmits output data to a monitoring device. The at least one non-member user device includes a bus interface, and a field programmable gate array (FPGA) that communicates with the bus interface. The FPGA is programmed to function as a main finite state machine that processes the broadcast message from the bus interface, and a transfer finite state machine that generates output data and transfers the generated output data to an output processor that communicates with the monitoring device. The monitoring device outputs a monitored data report.

5 Claims, 8 Drawing Sheets

(58) Field of Classification Search
CPC ......... H04L 12/40104; H04L 12/40189; H04L 67/12; H04L 2012/4028
See application file for complete search history.

(56) References Cited

U.S. PATENT DOCUMENTS

| | | | |
|---|---|---|---|
| 9,558,668 | B2 | 1/2017 | Letsu-Dake et al. |
| 10,741,084 | B2 | 8/2020 | Letsu-Dake et al. |
| 10,742,308 | B2 | 8/2020 | Abeel et al. |
| 10,819,791 | B2 * | 10/2020 | Bobrek ................ H04W 84/06 |
| 11,048,826 | B2 | 6/2021 | Long et al. |
| 11,165,821 | B2 | 11/2021 | Stevens et al. |
| 11,528,165 | B2 * | 12/2022 | Ohol ........................ B64F 5/60 |
| 11,729,195 | B1 | 8/2023 | Belzer et al. |
| 2007/0255430 | A1 * | 11/2007 | Sharma ................... G05B 9/03 700/20 |
| 2010/0287316 | A1 * | 11/2010 | Rittmueller ............. H04L 12/40 710/18 |
| 2019/0109825 | A1 * | 4/2019 | Verraes ............... H04L 63/0272 |
| 2019/0110334 | A1 | 4/2019 | Raje et al. |
| 2019/0312935 | A1 * | 10/2019 | Selvarajan ............. H04L 67/12 |
| 2022/0393905 | A1 | 12/2022 | Kuster |
| 2023/0030733 | A1 | 2/2023 | Rowan |

OTHER PUBLICATIONS

Phil Hubacek, "The Advanced Avionics Standard Communications Bus", Scientific Honeyweller, Honeywell's Corporate. Minneapolis, US, vol. 11, No. 1, Sep. 21, 1991 pp. 71-76.
"Unidirection Network"—Wikipedia, Version of Sep. 18, 2023, Retrieved from the Internet: URL:https://en.wikipedia.org/w/index.phptitle=Unidirectional_network&oldid=1175935280.
"ASCB Avionics Standard Communications Bus Version C," General Aviation Manufacturers Association, Issued Apr. 15, 1996.

* cited by examiner

AIRCRAFT MONITORING SYSTEM

TECHNICAL FIELD

The present disclosure relates to an aircraft monitoring system.

BACKGROUND

An aircraft may typically include an avionics system that monitors various systems of the aircraft and provides monitored data to various display devices to display the monitored data in the aircraft. An avionics standard communication bus (ASCB) structure may be implemented in the aircraft to transmit and to receive data between various member user devices that are members of the avionic communication network. The member user devices are typically capable of both transmitting data onto the ASCB, and to receive data transmitted by other member user devices onto the ASCB.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Figure 1:
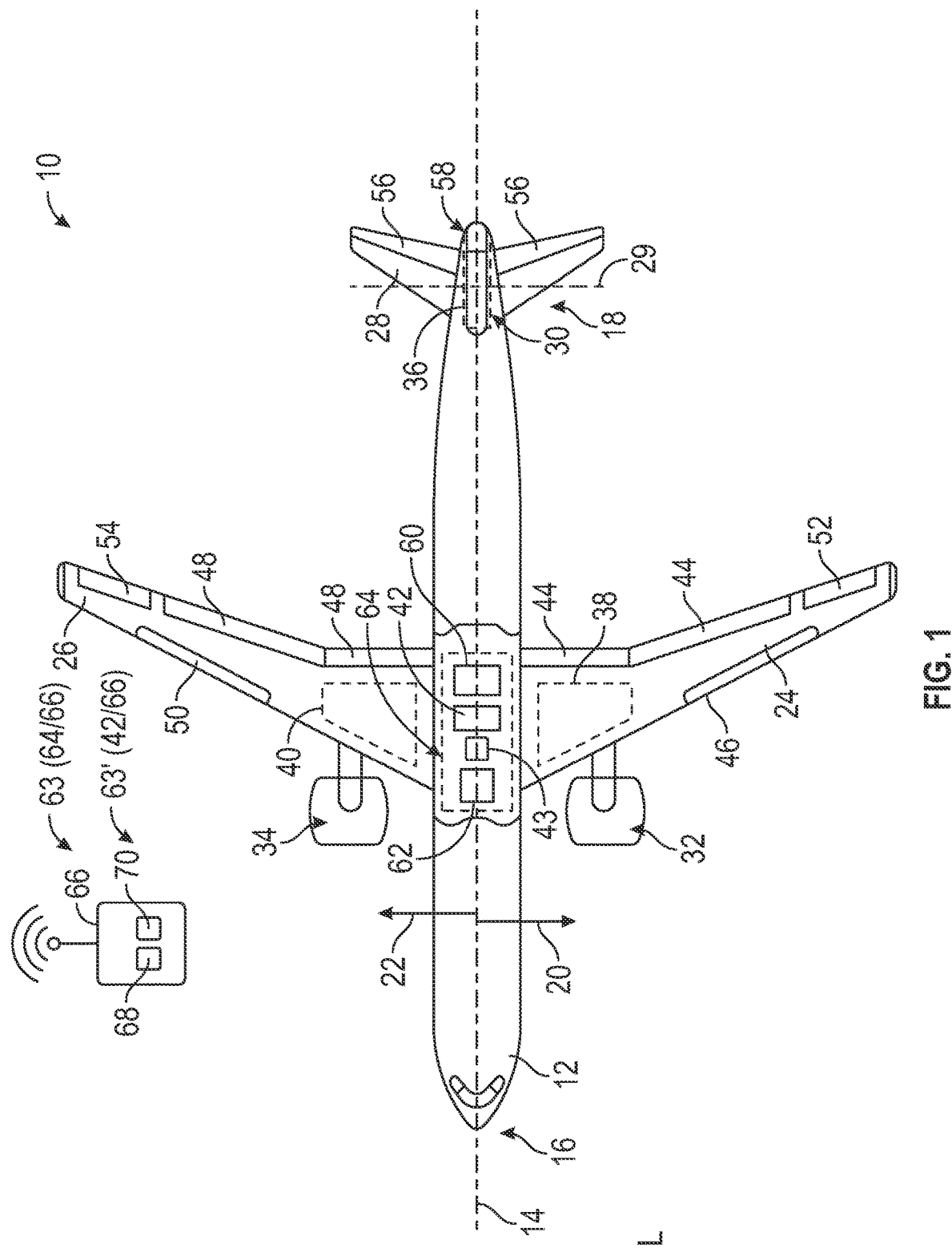
FIG. 1 is a top, partial cut-away view of an exemplary aircraft, according to an aspect of the present disclosure.

Features, advantages, and embodiments of the present disclosure are set forth, or apparent from, a consideration of the following detailed description, drawings, and claims. Moreover, the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," "third," "fourth," "fifth," or "sixth" may be used to distinguish one component from another and are not intended to signify location or importance of the individual components.

As used herein, the terms "primary" or "backup" may be used to distinguish one component from another and are not intended to signify location or importance of the individual components.

As used herein, the term "main" may be used to distinguish one component from another and is not intended to signify location or importance of the individual components.

As used herein, the term "two-way communication" may be used to mean both transmitting data onto a communication bus, and receiving data from the communication bus.

As used herein, the term "one-way communication" may be used to mean to receive data from the communication bus, but to not transmit data onto the communication bus.

An aircraft may typically include an avionics system that monitors various systems of the aircraft and provides the monitored data to various display devices to display the monitored data in the aircraft. An avionics standard communication bus (ASCB) structure may be implemented in the aircraft to transmit and to receive data between various member user devices that are members of the avionic communication network. The member user devices are typically capable of both transmitting data onto the ASCB, and to receive data transmitted by other member user devices onto the ASCB. To monitor various data of the member user devices, typically, a complex electronic circuit structure may be implemented and connected to the ASCB. Such a complex electronic circuit, however, increase the cost and the complexity of the monitoring portion of the avionics system.

The present disclosure addresses the foregoing by providing a monitoring system that includes a non-member user device that is connected to the avionics standard communication bus and that can receive user data transmitted onto the ASCB by member user devices. The non-member user device includes a field programmable gate array (FPGA) that is programmed to perform various hardware functions to process ASCB data transmitted onto the bus by member user devices into a readable format that can be utilized by a software monitoring program to generate a monitoring report. As a result, the complex electronic circuitry that otherwise may be required can be simplified by specially programming the FPGA to perform the hardware functions.

Referring now to the drawings, FIG. 1 is a top, partial cut-away view of an exemplary aircraft 10, in which various aspects of the present disclosure may be implemented. The aircraft 10 defines a longitudinal centerline 14 that extends therethrough and defines a forward end 16 of the aircraft 10, and an aft end 18 of the aircraft 10. The aircraft 10 includes a fuselage 12, extending longitudinally from the forward end 16 of the aircraft 10 towards the aft end 18 of the aircraft 10. In the top view of FIG. 1, the aircraft 10 includes a first side 20, which may also be referred to as a left side or a port side of the aircraft 10, and a second side 22, which may also be referred to as a right side or starboard side of the aircraft 10. The aircraft 10 further includes a port wing 24, a starboard wing 26, a horizontal stabilizer 28, and a vertical stabilizer 30. A port engine 32 is mounted to the port wing 24, and a starboard engine 34 is mounted to the starboard wing 26. In addition, an auxiliary power unit (APU) 36 (shown with hidden lines) may be mounted at the aft end 18 of the aircraft 10. An engine control system 42 is mounted within the fuselage 12 and includes controllers to control each of the port engine 32, the starboard engine 34, and the APU 36.

The port wing 24 also includes a port fuel supply system 38 and the starboard wing 26 includes a starboard fuel supply system 40. Both the port fuel supply system 38 and the starboard fuel supply system 40 may include, for example, one or more fuel tanks mounted within the respective wing, and one or more fuel pumps for controlling the flow of fuel between fuel tanks, and from a fuel delivery fuel tank to the respective engines. A fuel control system 43 is mounted within the fuselage 12 to control a flow of fuel within each of the port fuel supply system 38, and the starboard fuel supply system 40. Additional fuel tanks (not shown) may be included in the aircraft 10 and the fuel control system 43 may also control a flow of fuel from the additional fuel tanks. The fuel control system 43 also controls a flow of fuel to the APU 36.

The port wing 24 includes various control surfaces, such as port flaps 44 and port slats 46 to provide lift control to the aircraft 10, a port aileron 52 to provide roll control of the aircraft 10, and port wing spoilers (not shown) that provide drag control over the surface of the port wing 24. Similarly, the starboard wing 26 includes various control surfaces, such as starboard flaps 48 and starboard slats 50 to provide lift control to the aircraft 10, a starboard aileron 54 to provide roll control of the aircraft 10, and starboard wing spoilers (not shown) to provide drag control over the surface of the starboard wing 26. The horizontal stabilizer 28 may also include control surfaces, such as an elevator 56 to provide pitch control of the aircraft 10. Alternatively, the horizontal stabilizer 28 may omit the elevator 56 and instead, the entire horizontal stabilizer 28 can be rotatable about a pitch control axis 29 so to provide pitch control of the aircraft 10. The vertical stabilizer 30 also includes a rudder 58 to provide yaw control of the aircraft 10. A flight control system 60 functions to operate/control each of the control surfaces, including the port flaps 44, the port slats 46, the port aileron 52, the flaps 48, the slats 50, the aileron 54, the elevator 56, and the rudder 58.

The aircraft 10 may include other systems, such as an environmental control system 62 that may control environmental conditions within the fuselage 12, along with other component parts of the aircraft 10. Each of the engine control system 42, the flight control system 60, and the environmental control system 62, may be part of an avionics communication network (ACN) 64, which will be described in more detail below. Other systems not shown herein may also be part of the avionics communication network, including, for example, a navigation system, an entertainment system, a hydraulic system, a landing gear system, or a radio communication system, as but a few systems. In FIG. 1, a monitoring device 66, which may be part of ground support equipment arranged at a gate of an airport, may include a central processing unit 68 and a memory 70 that stores computer-executable code of an aircraft monitoring system program. The central processing unit 68 and the memory 70 may function to receive the output data from the avionics communication network 64 of the aircraft 10 and may output a monitored data report. For example, the avionics communication network 64 may wirelessly connect to the monitoring device 66 via a wireless network when the aircraft 10 arrives at the gate of the airport and may automatically output monitored data to the monitoring device 66. Alternatively, the monitoring device 66 may be provided within the aircraft 10 and can be manually removed from the aircraft 10 and connected with a ground support equipment (e.g., a computer at the gate) to output the monitored data and the monitored data report. Taken together, the avionics communication network 64 and the monitoring device 66 may be considered as an aircraft monitoring system 63. As will be explained below, the aircraft monitoring system 63 may monitor data from one or more systems within the aircraft 10. For example, the aircraft monitoring system 63 may include the engine control system 42 that monitors engine data for the port engine 32 and the starboard engine 34, along with the monitoring device 66, and may therefore, be referred to as an engine health monitoring system 63'. As for some examples, the engine data that may be monitored may include temperatures of various engine components (e.g., compressor section temperatures, combustor temperatures, turbine section temperatures, oil temperature), pressures of various components (e.g., pressure within the low pressure compressor, the high pressure compressor, the combustor, or the turbine section), speeds of the low pressure and/or high pressure spools, oil flow provided by the engine oil system, etc. Ground support personnel, and/or aircraft crewmembers, can then review the monitored data report for any anomalies that may have occurred within any of the aircraft systems. In particular, a health report can be generated for the port engine 32 and/or for the starboard engine 34. The health report may include the various monitored data, and may include a comparison of the monitored data with baseline data for the various engine systems so that the ground support personnel can analyze the data and determine if a problem, either potential or actual, may be present in the engine based on the health report data.

Figure 2:
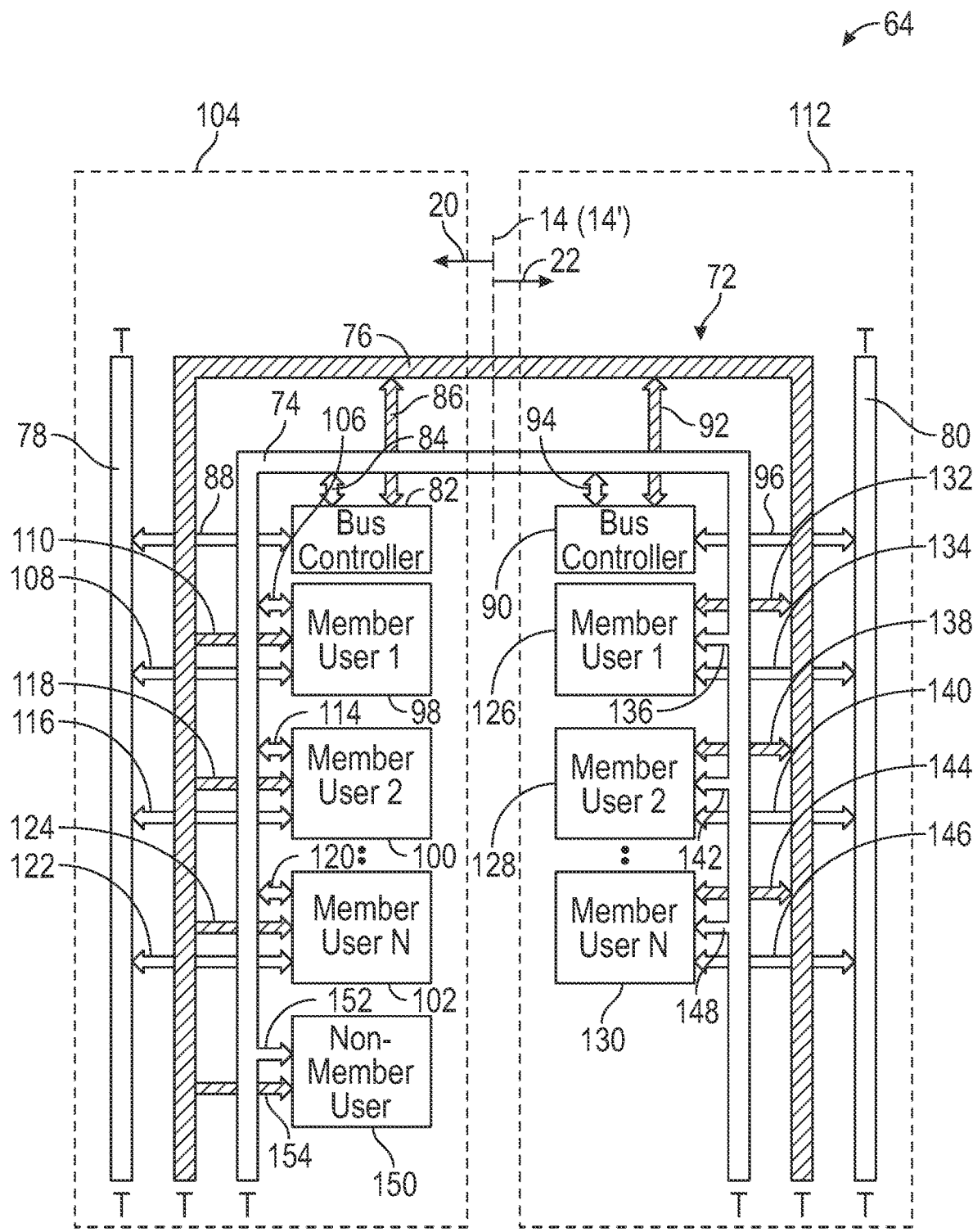
FIG. 2 depicts a schematic diagram of an exemplary avionics communication network architecture, according to an aspect of the present disclosure.

FIG. 2 depicts a schematic diagram of an exemplary avionics communication network architecture, according to an aspect of the present disclosure. As shown in FIG. 2, the avionics communication network 64 includes an avionics communication bus structure 72 that is installed on the aircraft 10. The avionics communication bus structure 72 may comport with the avionics standard communication bus-version C standard ("ASCB-Version C" or "ASCB-C"). However, the present disclosure is not limited to the ASCB-Version C standard and the present disclosure may be implemented with other communication bus standards instead. The avionics communication bus structure 72 includes a first-side primary communication bus 74, a first-side backup communication bus 78, a second-side primary communication bus 76, and a second-side backup communication bus 80. In FIG. 2, "T" represents a terminal end of a communication bus. FIG. 2 depicts the longitudinal centerline 14 of the aircraft 10 and depicts the first-side primary communication bus 74 extending through the first side 20 of the aircraft 10, extending from the first side 20 of the aircraft 10 across the longitudinal centerline 14 to the second side 22 of the aircraft 10, and extending through the second side 22 of the aircraft 10. Similarly, FIG. 2 depicts the second-side primary communication bus 76 extending through the second side 22 of the aircraft 10, extending from the second side 22 of the aircraft 10 across the longitudinal centerline 14 to the first side 20 of the aircraft 10, and extending through the first side 20 of the aircraft 10. The first-side backup communication bus 78 extends through the first side 20 of the aircraft 10, and the second-side backup communication bus 80 extends through the second side 22 of the aircraft 10. As will be described below, the first-side primary communication bus 74 may generally be a communication bus that is arranged for transmitting and receiving communications with various first (left) side aircraft components (e.g., the various first (left) side components, such as port engine 32) on the first side 20 (e.g., on the left side) of the aircraft 10. The first-side primary communication bus 74 may also be arranged for receiving communications with various aircraft components from the second (right) side 22 of the aircraft 10, such as starboard engine 34.

Similarly, the second-side primary communication bus 76 may generally be a communication bus that is arranged for transmitting and receiving communications with various second (right) side aircraft components (e.g., the starboard engine 34) on the second (right) side 22 of the aircraft 10. The second-side primary communication bus 76 may also be arranged for receiving communications from various first (left) side 20 aircraft components, such as from port engine 32.

While FIG. 2 depicts the longitudinal centerline 14 dividing the avionics communication bus structure 72 into the first side and the second side, the first-side primary communication bus 74 and the second-side primary communication bus 76 need not be physically arranged on either side of the longitudinal centerline 14. Rather, the longitudinal centerline 14 may be a theoretical centerline 14' that is merely shown as a representation of the avionics communication bus structure 72 including both a first side structure and a second side structure. That is, the avionics communication bus structure 72 of FIG. 2 may be physically arranged anywhere within the aircraft 10, including within the first side 20, within the second side 22, or centrally located so as to be partially on the first side 20 and partially on the second side 22.

Referring still to FIG. 2, the avionics communication bus structure 72 further includes a first-side bus controller 82 that is arranged to have two-way communication 84 with the first-side primary communication bus 74. As used herein, two-way communication is intended to mean to both transmit data onto a communication bus, and to receive data from the communication bus. On the other hand, as used herein, one-way communication is intended to mean to receive data from the communication bus, but to not transmit data onto the communication bus. That is, the one-way communication may merely be a "listening mode" to receive data/messages from the communication bus and to detect particular messages/data that is transmitted onto the communication bus by another device. The first-side bus controller 82 is also arranged to have two-way communication 86 with the second-side primary communication bus 76, and to have two-way communication 88 with the first-side backup communication bus 78. The first-side bus controller 82 controls communications broadcast onto the first-side primary communication bus 74 by transmitting request messages for any one or more first-side network member user devices (described below) to broadcast a message onto the first-side primary communication bus 74. By virtue of the two-way communication 86 and the two-way communication 88, the first-side bus controller 82 transmits/receives requests onto/from the second-side primary communication bus 76 and the first-side backup communication bus 78.

The avionics communication bus structure 72 further includes a second-side bus controller 90 that is arranged to have two-way communication 92 with the second-side primary communication bus 76. The second-side bus controller 90 is also arranged to have two-way communication 94 with the first-side primary communication bus 74, and to have two-way communication 96 with the second-side backup communication bus 80. The second-side bus controller 90 controls communications broadcast onto the second-side primary communication bus 76 by transmitting request messages for any one or more second-side network member user devices (described below) to broadcast a message onto the second-side primary communication bus 76. By virtue of the two-way communication 94 and the two-way communication 96, the second-side bus controller 90 transmits/receives requests onto/from the first-side primary communication bus 74 and the second-side backup communication bus 80.

Referring still to FIG. 2, the avionics communication network 64 further includes a plurality of member user devices that are connected to the avionics communication bus structure 72. The plurality of member user devices are arranged to include member user devices that are arranged on the first side 20 (also referred to as a left side or a port side) and member user devices that are arranged on the second (the right or the starboard) side 22. For example, the first side 20 may include a first member user device 98, a second member user device 100, and a third member user device 102, each of which is a dedicated member of a first-side network 104. The present disclosure is not limited to three member user devices on the first-side network 104 and additional member user devices could be included in the first-side network 104. The first member user device 98 may be, for example, an engine monitoring network member user device (98') for monitoring the port engine 32, and may be part of the port engine 32, or may be a part of the engine control system 42 to control the port engine 32. The first member user device 98 is implemented to have two-way communication 106 between the first member user device 98 and the first-side primary communication bus 74, and also to have two-way communication 108 between the first member user device 98 and the first-side backup communication bus 78. In this manner, the first-side bus controller 82 provides a request message onto the first-side primary communication bus 74 for the first member user device 98 to broadcast a message/data onto the first-side primary communication bus 74, and the first member user device 98 then broadcasts the message/data onto the first-side primary communication bus 74. The first member user device 98 also receives broadcast messages/data that are broadcast onto first-side primary communication bus 74 by other member user devices via the two-way communication 106 and/or the two-way communication 108. In addition, the first member user device 98 may have one-way communication 110 with the second-side primary communication bus 76 so as to receive messages/data that may be transmitted from devices on a second-side network 112.

The second member user device 100 may be, for example, a controller that is part of the flight control system 60 that provides control of the first (port) side control surfaces, such as the port flaps 44, the port slats 46, and the port aileron 52. The second member user device 100 is also implemented to have two-way communication 114 between the second member user device 100 and the first-side primary communication bus 74, and also to have two-way communication 116 between the second member user device 100 and the first-side backup communication bus 78. In this manner, the first-side bus controller 82 provides a request message onto the first-side primary communication bus 74 for the second member user device 100 to broadcast a message/data onto the first-side primary communication bus 74, and the second member user device 100 may then broadcast the message/data onto the first-side primary communication bus 74. The second member user device 100 also receives broadcast messages/data that are broadcast onto first-side primary communication bus 74 by other member user devices via the two-way communication 114 and/or the two-way communication 116. In addition, the second member user device 100 may have one-way communication 118 with the second-side primary communication bus 76 so as to receive messages/data that may be transmitted from devices on the second-side network 112.

The third member user device 102 and any additional member user devices within the first-side network 104 may be similarly configured to that of the first member user device 98 and the second member user device 100. That is, the third member user device 102 may have two-way communication 120 between the third member user device 102 and the first-side primary communication bus 74, and two-way communication 122 between the third member user device 102 and the first-side backup communication bus 78. Similarly, the third member user device 102 may have one-way communication 124 with the second-side primary communication bus 76. The third member user device 102 may be, for example, a controller that is part of the fuel control system 43, and may provide control of the port fuel supply system 38.

Similarly, the second-side network 112 includes a fourth member user device 126, a fifth member user device 128, and a sixth member user device 130, each of which is a dedicated member of the second-side network 112. The present disclosure is not limited to three member user devices on the second-side network 112 and additional member user devices could be included in the second-side network 112. The fourth member user device 126 may be, for example, an engine controller for controlling the starboard engine 34, and may be part of the starboard engine 34, or may be a part of the engine control system 42 to control the starboard engine 34. The fourth member user device 126 is implemented to have two-way communication 132 between the fourth member user device 126 and the second-side primary communication bus 76, and also to have two-way communication 134 between the fourth member user device 126 and the second-side backup communication bus 80. In this manner, the second-side bus controller 90 provides a request message onto the second-side primary communication bus 76 for the fourth member user device 126 to broadcast a message/data onto the second-side primary communication bus 76, and the fourth member user device 126 then broadcasts the message/data onto the second-side primary communication bus 76. The fourth member user device 126 also receives broadcast messages/data that are broadcast onto second-side primary communication bus 76 by other member user devices via the two-way communication 1132 and/or the two-way communication 134. In addition, the fourth member user device 126 may have one-way communication 136 with the first-side primary communication bus 74 so as to receive messages/data that may be transmitted from devices on a first-side network 104.

The fifth member user device 128 may be, for example, a controller that is part of the flight control system 60 that provides control of the second (starboard) side control surfaces, such as the starboard flaps 48, the starboard slats 50, and the starboard aileron 54. The fifth member user device 128 is also implemented to have two-way communication 138 between the fifth member user device 128 and the second-side primary communication bus 76, and also to have two-way communication 140 between the fifth member user device 128 and the second-side backup communication bus 80. In this manner, the second-side bus controller 90 provides a request message onto the second-side primary communication bus 76 for the fifth member user device 128 to broadcast a message/data onto the second-side primary communication bus 76, and the fifth member user device 128 then broadcasts the message/data onto the second-side primary communication bus 76. The fifth member user device 128 also receives broadcast messages/data that are broadcast onto second-side primary communication bus 76 by other member user devices via the two-way communication 138 and/or the two-way communication 140. In addition, the fifth member user device 128 may have one-way communication 142 with the first-side primary communication bus 74 so as to receive messages/data that may be transmitted from devices on the first-side network 104.

The sixth member user device 130 and any additional member user devices within the second-side network 112 may be similarly configured to that of the fourth member user device 126 and the fifth member user device 128. That is, the sixth member user device 130 may have two-way communication 144 between the sixth member user device 130 and the second-side primary communication bus 76, and two-way communication 146 between the sixth member user device 130 and the second-side backup communication bus 80. Similarly, the sixth member user device 130 may have one-way communication 148 with the first-side primary communication bus 74. The sixth member user device 130 may be, for example, a controller that is part of the fuel control system 43, and may provide control of the starboard fuel supply system 40.

The first-side network 104 further includes a non-member user device 150 that is a non-member of the first-side network 104. Rather, the non-member user device 150 may merely be configured as a "listening device" that receives messages/data transmitted onto the first-side primary communication bus 74 and/or messages/data transmitted onto the second-side primary communication bus 76, but is unable to transmit messages/data onto either the first-side primary communication bus 74 or the second-side primary communication bus 76. In one aspect, the non-member user device 150 may be a non-member engine monitoring user device 150' that is specifically configured for monitoring the broadcast of messages by the engine monitoring network member user device 98'. The non-member user device 150 has a one-way communication 152 with the first-side primary communication bus 74 so as to receive messages that may be broadcast onto the first-side primary communication bus 74 by any of the first member user device 98, the second member user device 100, and/or the third member user device 102. The non-member user device 150 may also have an optional one-way communication 154 with the second-side primary communication bus 76 so as to receive messages broadcast onto the second-side primary communication bus 76 by any of the fourth member user device 126, the fifth member user device 128, and/or the sixth member user device 130. The non-member user device 150 then process the received messages and outputs digital data to the monitoring device 66 (FIG. 1), as will be described in more detail below.

Figure 3:
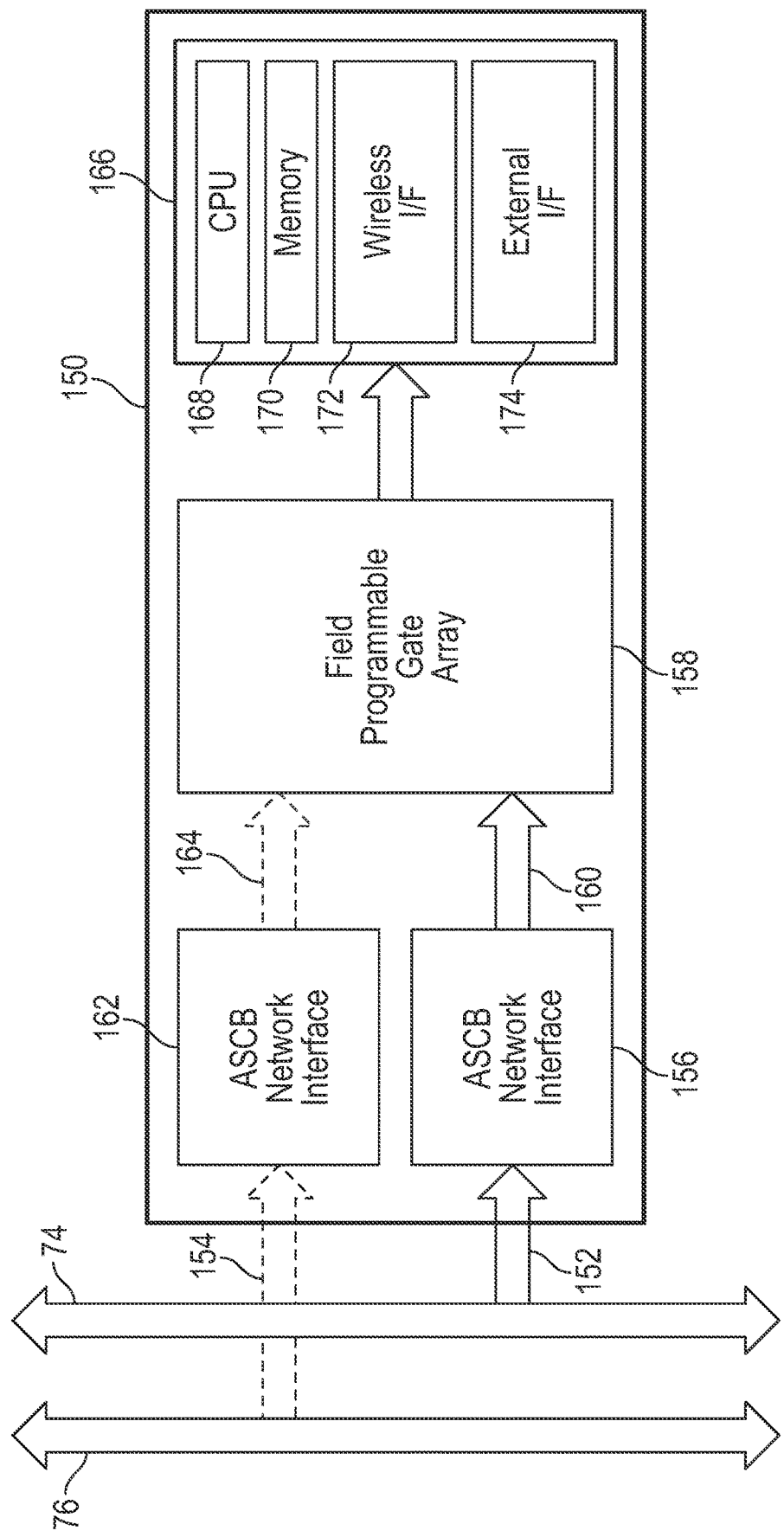
FIG. 3 is a schematic diagram of a hardware layout for a non-member user device, according to an aspect of the present disclosure.

FIG. 3 is a schematic diagram depicting one example of a hardware architecture for a non-member user device, according to an aspect of the present disclosure. As shown in FIG. 3, the non-member user device 150 includes an ASCB Network Interface 156 that communicates, via the one-way communication 152 with the first-side primary communication bus 74, to receive messages that are broadcast onto the first-side primary communication bus 74. As discussed above, any of the first member user device 98, the second member user device 100, and the third member user device 102 may broadcast messages onto the first-side primary communication bus 74 in response to requests transmitted onto the first-side primary communication bus 74 by the first-side bus controller 82. The messages broadcast onto the first-side primary communication bus 74 are thus received by the ASCB Network Interface 156 and are transmitted to a field programmable gate array (FPGA) 158 via a communication channel 160. In addition, when the non-member user device 150 is also arranged to receive messages transmitted onto the second-side primary communication bus 76 via the one-way communication 154, an ASCB network interface 162 may receive the broadcast messages that are broadcast onto the second-side primary communication bus 76 and transmit the received messages to the FPGA 158 via a communication channel 164. The FPGA 158 and the programming architecture thereof will be described in more detail below, but briefly, the FPGA 158 processes the received broadcast messages to generate digital output data to be output to the monitoring device 66 (FIG. 1). The non-member user device 150 further includes an output control circuit 166 that includes a processor (CPU) 168, a memory 170, a wireless interface 172, and an external interface 174 for connecting to an external device. As will be described below, the output control circuit 166 receives processed digital data from the FPGA 158, and then outputs the processed digital data to the monitoring device 66 via, for example, the wireless interface 172 and/or the external interface 174.

Figure 4:
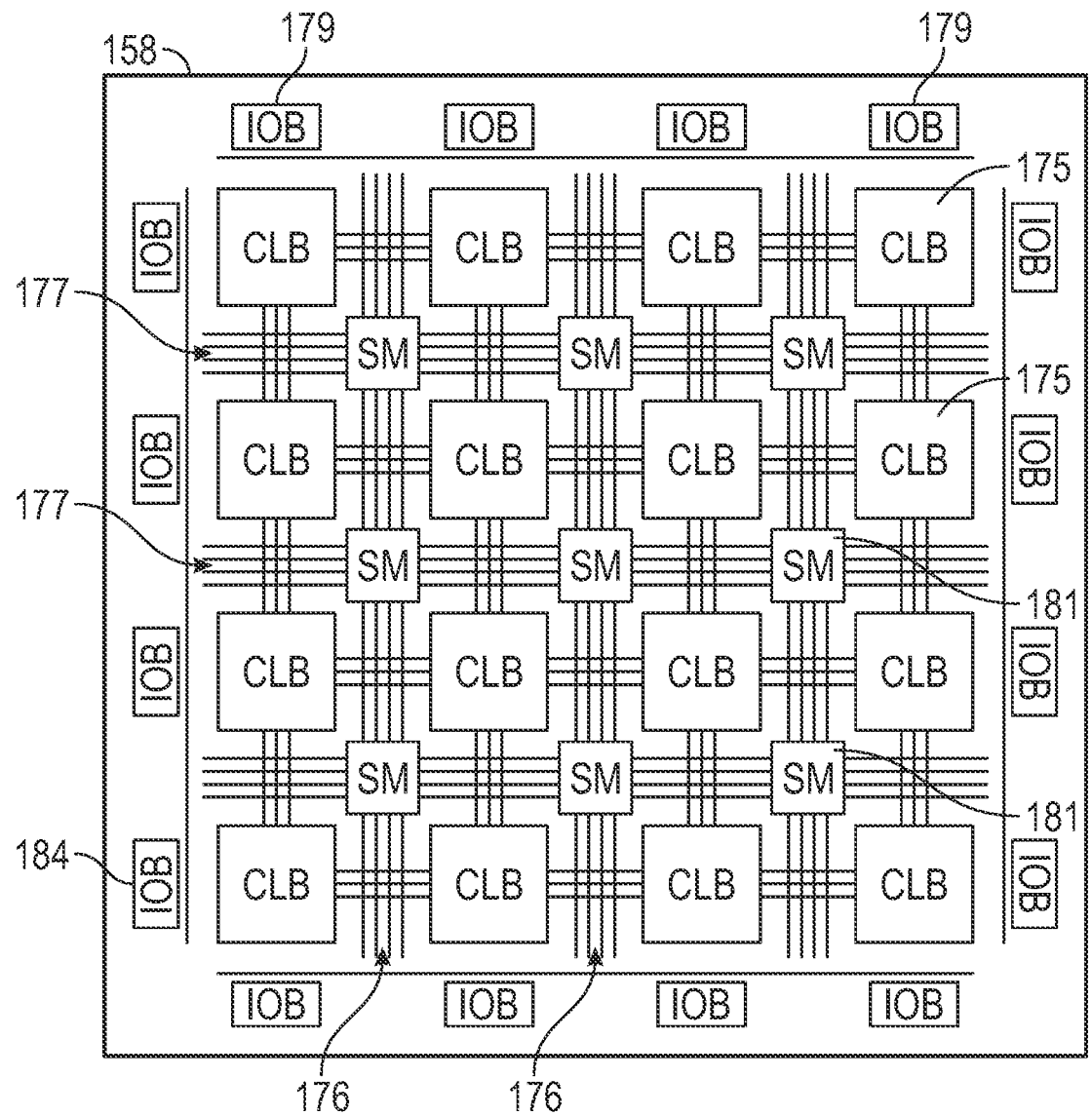
FIG. 4 depicts a schematic diagram of an exemplary hardware architecture for a field programmable gate array, according to an aspect of the present disclosure.

FIG. 4 depicts an example hardware architecture for the field programmable gate array 158, according to an aspect of the present disclosure. The Field Programmable Gate Array 158 is generally a semiconductor device that is based around a matrix of configurable logic blocks (CLBs) connected via programmable interconnects made with horizontal routing channels 177 and vertical routing channels 176 connected with a plurality of input/output blocks 179. A plurality of switch matrices 181 are also provided in the programmable interconnects. The FPGA 158 can be specially programmed to a desired application or functionality requirements after manufacturing.

Figure 5:
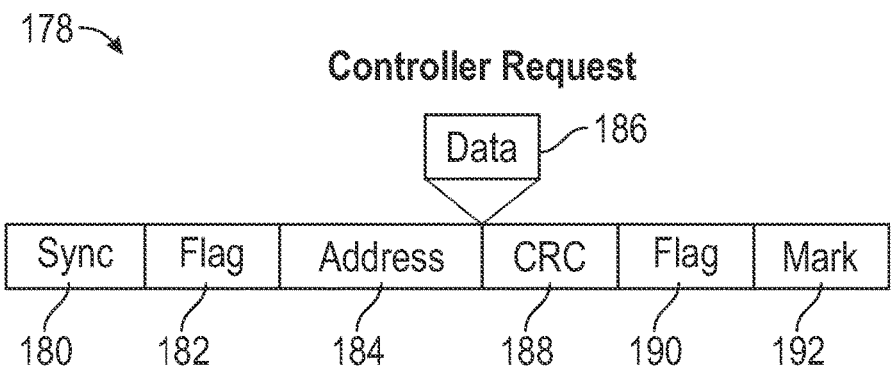
FIG. 5 depicts a block diagram of an exemplary format for a controller request message, according to an aspect of the present disclosure.

FIG. 5 depicts a block diagram of an exemplary format for a bus controller request message 178, according to an aspect of the present disclosure. As described above, the communication bus architecture of the present disclosure may comport with the ASCB-Version C standard. According to the ASCB-C standard, the bus controller issues any one of four different types of bus controller request messages, including (1) a frame start message, (2) a frame control message, (3) a bus controller status message, and (4) a user request message. The frame start message and the frame control message are transmitted by the bus controller once each frame, at the frame beginning. The bus controller status message is sent by each bus controller immediately after the frame control message, and is used to indicate which mode each of the bus controllers is operating, each controller request for active testing, and a history of the last monitor trip suffered by that bus controller. The user request message is transmitted after the frame start, frame control, and controller status messages, and are used for the active bus controller to request that each member user device transmit on the ASCB. The user request sequence messages are transmitted by the active controller to request transmission by each member user device in a preset order.

The FIG. 5 message format generally comports with the ASCB-Version C standard. As seen in FIG. 5, the bus controller request message 178 includes a SYNC field 180, a FLAG field 182, an ADDRESS field 184, a CRC field 188, a FLAG field 190, and a MARK field 192. The bus controller request message 178 may also optionally include a DATA field 186, as will be described below. The SYNC field is an 11-bit sync pattern that precedes each message and each listener (user device) on the avionics communication bus structure 72 uses the command sync to synchronize its data decoding clock to the incoming message. The FLAG field 182 may be six consecutive 1's. If the FLAG field 182 includes seven or more consecutive 1's, the user device will recognize the message as an abort or marking condition, as appropriate. In accordance with the ASCB-Version C standard, the minimum bus protocol requirements for starting a message are that the message include both the SYNC field 180 and the FLAG field 182. The address field 184 may include an identification address of the bus controller when the controller request message type is any of the frame start sequence, the frame control sequence, or the bus controller status message. On the other hand, the address field 184 may include an identification address of a member user device when the controller request message type is the user request sequence message. The DATA field 186 may be included in the case when the bus controller message type is either the frame control message or the bus controller status message. The CRC field 188 is a hardware cyclic redundancy check (CRC) that is used for error detection on the ASCB. The FLAG field 190 is similar to the FLAG field 182. The MARK field 192 is a single 8-bit marking character consisting of eight sequential ones. The MARK field 192 is used by the ASCB listeners to ensure that the end-of-message flag is clocked through the circuitry and is, therefore, positively distinguished from a start-of-message flag. Thus, the end of transmission of a message includes the FLAG field 190 and the MARK field 192.

Figure 6:
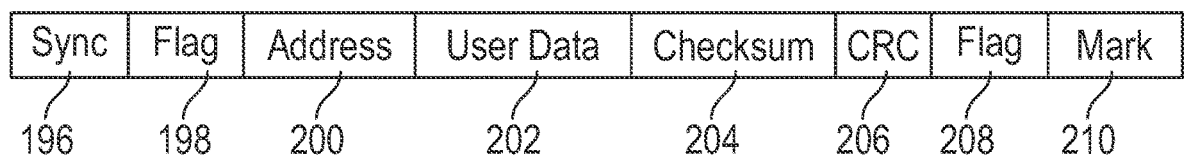
FIG. 6 depicts a block diagram of an exemplary format for a member user device broadcast message, according to an aspect of the present disclosure.
Figure 7:
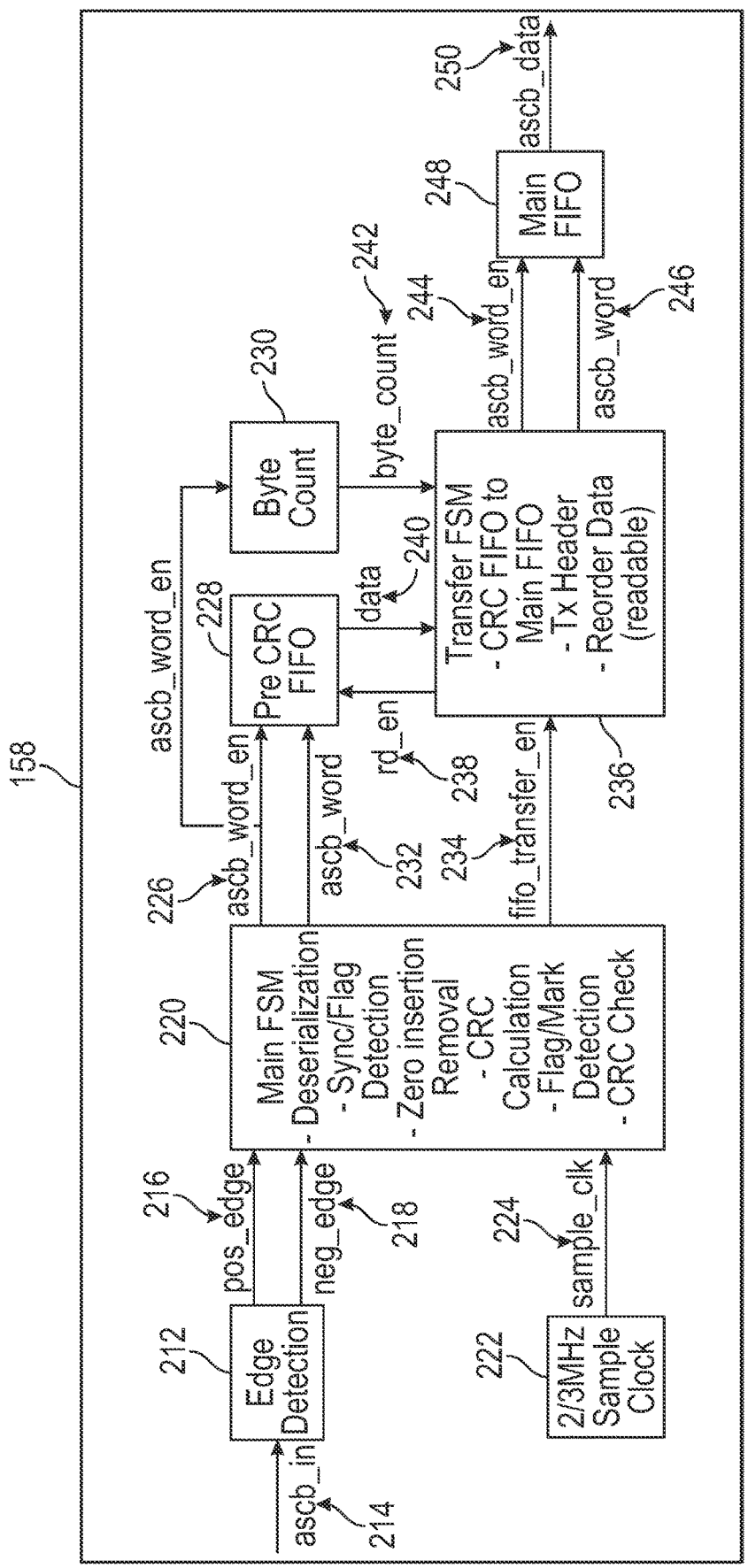
FIG. 7 depicts a schematic diagram of an exemplary programming blocks of a field programmable gate array, according to an aspect of the present disclosure.

FIG. 6 depicts a block diagram of an exemplary format for a member user broadcast message 194, according to an aspect of the present disclosure. The member user broadcast message 194 may be broadcast by any of the member user devices in response to receiving a user request message from a bus controller. For example, the first member user device 98 may generate and broadcast a member user broadcast message 194 onto the first-side primary communication bus 74 and/or onto the first-side backup communication bus 78 after receiving a bus controller request message 178 (i.e., a user request message) transmitted onto the first-side primary communication bus 74 by the first-side bus controller 82. As shown in FIG. 6, the member user broadcast message 194 includes a SYNC field 196, a FLAG field 198, an ADDRESS field 200, a USER DATA field 202, a CHECKSUM field 204, a CRC field 206, a FLAG field 208, and a MARK field 210. The format and the contents of the SYNC field 196, the FLAG field 198, the CRC field 206, the FLAG field 208, and the MARK field 210 are similar to the SYNC field 180, the FLAG field 182, the CRC field 188, the FLAG field 190, and the MARK field 192, respectively, described above for the bus controller request message. The ADDRESS field 200 may include the address of the member user device that is broadcasting the member user broadcast message. The USER DATA field 202 includes the requested user data of the member user device. The data format of the user data used in the member user broadcast message 194 may be similar to the High-level Data Link Control (HDLC). Under the ASCB-C standard, within a frame, a binary zero (0) is inserted by the transmitting member user device after any succession of five consecutive binary 1's to prevent any data in the data field from appearing to be a closing flag. An exception to the zero insertion is for the FLAG field 208 and the MARK field 210. The devices that receive the message with the zero's inserted can ignore the inserted zeroes that follow five consecutive binary 1's and continue recognition of the remainder of the data field with the next bit following the inserted zero. The CHECKSUM field 204 may be a user generated checksum of its user data. The member user broadcast message 194 can be received by all other member user devices on the avionics communication bus structure 72. The member user broadcast message 194 that is broadcast by any of the member user devices on the avionics communication bus structure 72 is also received by the non-member user device 150. Processing of a member user broadcast message 194 by the non-member user device 150 will now be described with regard to FIG. 3 and FIG. 7.

As was described above with regard to FIG. 3, a member user broadcast message that is broadcast onto the first-side primary communication bus 74 is received by the ASCB Network Interface 156 of the non-member user device 150, and the broadcast message is transmitted to the FPGA 158 for processing. The FPGA 158 is programmed to perform processing as shown in various blocks of FIG. 7. The various blocks of FIG. 7 may correspond to one or more of the configurable logic blocks 175 (FIG. 4) that are programmed to perform the functions of the various blocks of FIG. 7 described hereafter. An edge detection block 212 receives, as input, an ascb_in signal 214 from the ASCB Network Interface 156 (FIG. 3), and performs edge detection on the ascb_in signal 214. Edge detection is the process of detecting a change in a signal from either a zero to a one (positive edge detection) or from a one to a zero (negative edge detection). Edge detection results for either a positive edge detection 216 (pos_edge signal) and/or a negative edge detection result 218 (neg_edge signal) are output from the edge detection block 212 to a main finite state machine (MFSM) block 220. A sample clock 222 outputs a sample_clk signal 224 to the MFSM block 220.

The MFSM block 220 performs various processing to the incoming message, including (1) deserialization, (2) sync/flag detection, (3) zero insertion removal, (4) CRC calculation, (5) flag/mark detection, and (6) CRC check. The MFSM block 220 then outputs an ascb word enable signal 226 (ascb_word_en) to a Pre CRC first-in-first-out (FIFO) block 228 and to a Byte Count block 230. The MFSM block 220 also outputs an ascb word signal 232 (ascb_word) to the Pre CRC FIFO block 228, and outputs a first-in-first-out (fifo) transfer enable signal 234 (fifo_transfer_en) to a Transfer Finite State Machine (TFSM) block 236.

The TFSM block 236 is generally programmed to reorganize the ASCB formatted data into a format that is usable by the CPU 168 and the memory 170, along with software of the monitoring device 66 for generating the monitoring report. Thus TFSM block 236 provides a read enable signal 238 (rd_en) to the Pre CRC FIFO block 228 and receives a data signal 240 from the Pre CRC FIFO block 228. In addition, the TFSM block 236 receives a byte count signal 242 (byte_count) from the Byte Count block 230. The TFSM block 236 performs CRC FIFO to Main FIFO conversion, generates a transmission header (Tx header), and reorders the data into a readable format. The TFSM block 236 then outputs an ascb word enable signal 244 (ascb_word_en) to a Main FIFO block 248, and also outputs an ascb word signal 246 (ascb_word) to the Main FIFO block 248. The Main FIFO block 248 then outputs an ascb data signal 250 (ascb_data) to the output control circuit 166 (FIG. 3), where the ascb data signal is processed by the CPU 168 and stored in the memory 170.

Upon receiving the ascb data signal 250 and storing the data in the memory 170, a monitoring system program stored in the memory 170 attempts to establish a wireless connection via the wireless interface 172 with the monitoring device 66. The wireless connection may be made while the aircraft 10 is in flight when the aircraft 10 includes the ability to transmit data from the aircraft 10 to the monitoring device 66 while in flight. For example, the third member user device 102 may be part of a navigation system that monitors and collects navigation data of the aircraft 10, such as global positioning system (GPS) data of the aircraft 10, air speed data of the aircraft 10, flight heading data of the aircraft 10, and altitude data of the aircraft 10. The navigation data may be transmitted from the aircraft 10 to the monitoring device 66 while the aircraft 10 is in flight. Alternatively, the wireless connection can be established between the output control circuit 166 and the monitoring device 66 when the aircraft 10 approaches or becomes parked at a gate. For example, in a case when the first user member device 98 is the engine monitoring network member user device 98', monitored engine data may be transmitted to the monitoring device 66 once the aircraft 10 approaches the gate at the conclusion of a flight. Once the wireless connection is established, the monitoring system program in the memory 170 transmits the stored ascb data to the monitoring device 66. The monitoring device 66 stores the received ascb data and generates a monitored data report. The monitored data report is then output by the monitoring device 66, such as by displaying the report on a display screen, transmitting the report to an original equipment manufacturer, such as an engine manufacturer, or by printing the report.

Figures 8, 8A:
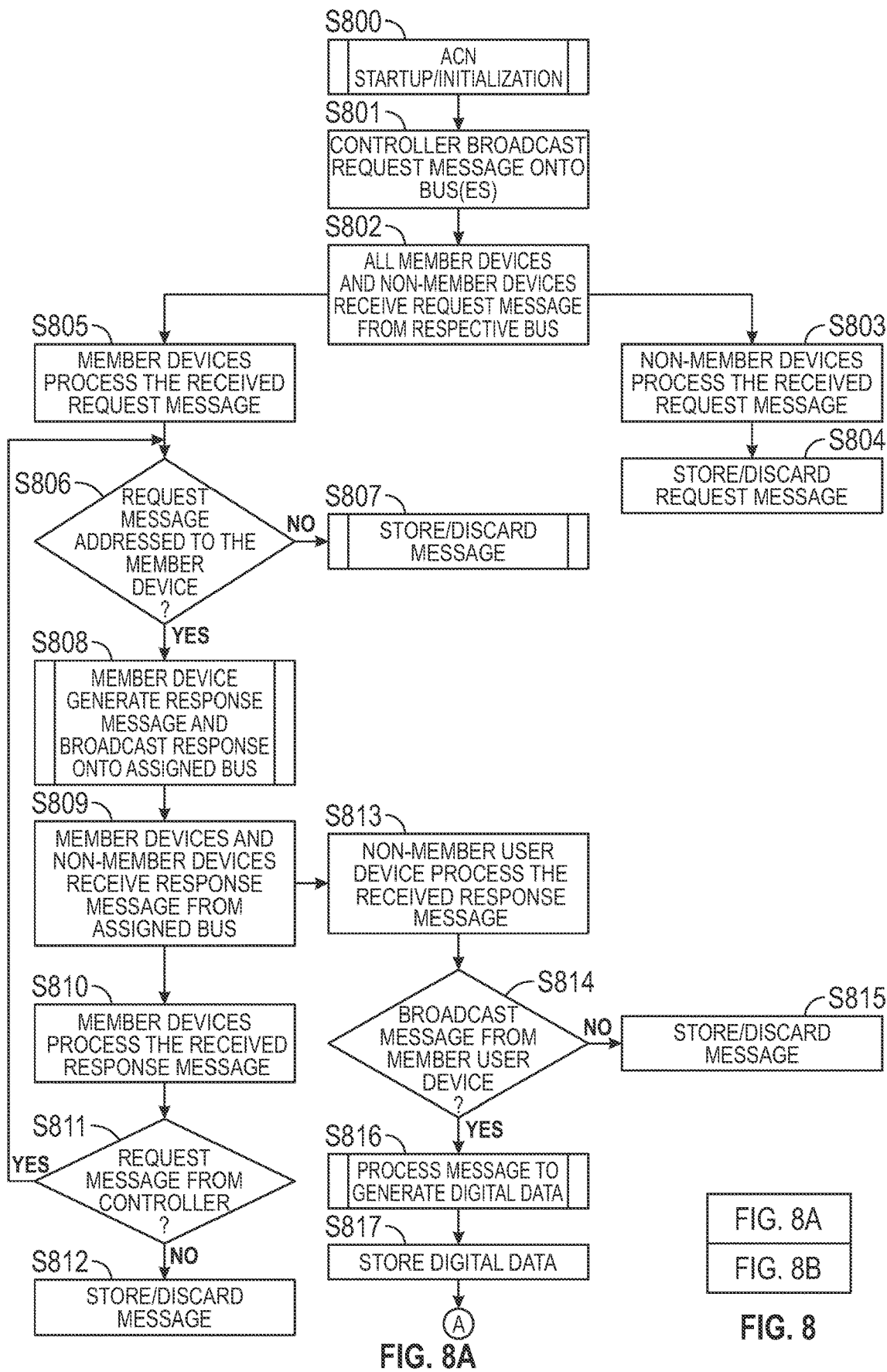
FIG. 8, which consists of FIGS. 8A and 8B together, is a flowchart of process steps executed by an aircraft monitoring system, according to an aspect of the present disclosure.
Figure 8B:
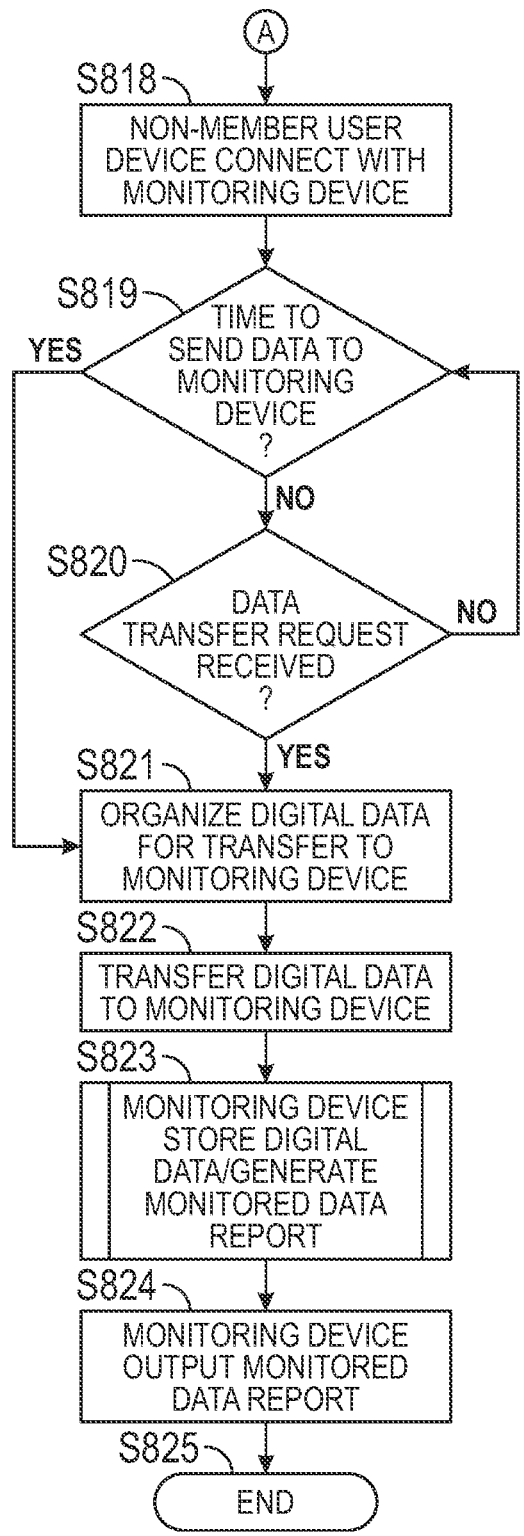

FIG. 8, which consists of FIGS. 8A and 8B together, is a flowchart of process steps performed by the aircraft monitoring system 63, according to an aspect of the present disclosure. In step S800, the avionics communication network (ACN) 64 is started-up or initialized, along with other systems of the aircraft 10. The avionics communication network 64 may be started, for example, when power is initiated to the aircraft 10 during an aircraft startup phase, such as when a pre-flight check of the aircraft systems may be performed during the aircraft startup phase. During the startup phase, the avionics communication network 64 may be one system among may systems of the aircraft 10 that is started or initiated. As part of the ACN 64 startup process, either one or both of the first-side bus controller 82 or the second-side bus controller 90 may broadcast request messages onto one or both of the first-side primary communication bus 74 or the second-side primary communication bus 76. The request message(s) may be in the form as depicted in FIG. 5, for example. As one example, the first-side bus controller 82 may issue a global broadcast message for all of the member user devices (e.g., the first member user device 98, the second member user device, 100, etc.) connected to avionics communication network 64 to provide a startup status response message confirming whether or not the member user device has started-up normally. Similarly, the second-side bus controller 90 may issue a similar global broadcast message for all of the member user devices connected to the avionics communication network 64 (e.g., the fourth member user device 126, the fifth member user device 128, etc.) to provide a startup status response message confirming whether or not the member use device has stared-up normally.

Once the avionics communication network 64 has been started up normally (i.e., the first-side bus controller 82 confirms that all of the member user devices connected to the first-side primary communication bus 74 have started-up successfully, and the second-side bus controller 90 confirms that all of the member user devices connected to the second-side primary communication bus 76 have started-up successfully), in step S801, the first-side bus controller 82 and the second-side bus controller 90 may broadcast request messages onto either one or both of the first-side primary communication bus 74 or the second-side primary communication bus 76. The request messages may be any one of the above-described four types of bus controller request messages, including (1) the frame start message, (2) the frame control message, (3) the bus controller status message, and (4) the user request message. For simplicity, in the present method of FIG. 8, user request messages will be discussed with regard to the first-side bus controller 82, the first member user device 98, and the non-member user device 150. The method, however, can be performed by the first-side bus controller 82 with any one or more of the member user devices connected to the first-side primary communication bus 74 and the non-member user device 150, or by the second-side bus controller 90 with any one o more of the member user devices connected to the second-side primary communication bus 76. In step S801, for example, the first-side bus controller 82 may broadcast a user request message addressed to the first member user device 98. An example of a user request message broadcast by the first-side bus controller 82 may be as follows: (<SYNC>7E XX<CRC>7E FF), where XX is the request address (for example, 8B for EFIS-3 and EFIS-4 basic data, where EFIS=Electronic Flight Instrument System and is a flight deck instrument display system in which the display technology used is electronic rather than electromechanical).

In step S802, all of the member user devices and the non-member user device 150 receive the request message broadcast by the first-side bus controller 82 onto the first-side primary communication bus 74 and onto the second-side primary communication bus 76. The broadcast request message is then processed accordingly by each of the member user devices and by the non-member user device 150. In step S803, the non-member user device 150 processes the received broadcast message. For example, the non-member user device 150 processes the broadcast message as described above with regard to FIGS. 3 to 7. Since the broadcast message is not a message with user data from one of the member user devices, in step S804 the non-member user device 150 may simply store the request message, or may discard the request message.

On the other hand, in step S805, each of the member user devices process the received request message. In processing the received request message, each member user device may first obtain the address field 184 (FIG. 5) from the received broadcast message, and in step S806, makes a determination whether or not the address field 184 contains the address of the member user device itself. If not (NO in step S806), then, in step S807 the member user device may simply store or discard the received broadcast request message. If, however, the member user device determines that the address field 184 includes the address of the member user device (YES in step S806), then, in step S808, the member user device performs a process to generate a response message to include the requested user data, and broadcasts the response message onto the communication bus. For example, in the case where the first-side bus controller 84 broadcasts a request message containing the address for the first member user device 98, the first member user device 98 generates the broadcast response message, which includes its address in the address field 200 (FIG. 6) of the user broadcast message. The response broadcast message includes the requested user data in the user data field 202 (FIG. 6). An example form of the user data may be: <SYNC>7E W1 . . . . Wn<CRC>7E FF, where W1 to Wn are 16-bit words. W1 bit 0-7 is the user address. Wn is a checksum or a 16-bit CRC (depending on the user). The value of n is variable from user to user, but it is always constant for a given user. A typical value of n is 68 for FWC-1, FWC-2, FWC-3 and FWC-4. For that user, W68 is a checksum on W1 to W67. The broadcast response message in the form discussed for FIG. 6 is broadcast onto the first-side primary communication bus 74 by the first member user device 98.

In step S809, each of the member user devices and the non-member user device 150 receive the broadcast response message that is broadcast onto the first-side primary communication bus 74 by the first-member user device 98 and process the message accordingly. As for the member user devices, the broadcast message is received in step S810, and in step S811, each of the member user devices determine whether or not the broadcast message is a request message from the first-side bus controller 84. If not (NO in step S811), then in step S812, the member user device can either store or discard the broadcast member user message. If the member user device determines in S811 that the received message is a request message (YES in step S811), then flow returns to step S806 for the member user device to process the request message.

With regard to the non-member user device 150, in step S813, the non-member user device processes the received response message, and in step S814, determines whether or not the received broadcast message is from a member user device. If not (NO in step S814, then, in step S815 the non-member user device 150 may either store or discard the received message without any further processing of the message. If it is determined that the received broadcast message is a message that has been broadcast by a member user device (YES in step S814), then, in step S816, the non-member user device processes the received broadcast message to generate digital data from the broadcast message. The process of step S816 corresponds to the processing described above by the non-member user device 150 with regard to FIGS. 3 to 7, and that description is incorporated here and will not be repeated. Once the digital data has been generated, in step S817, the digital data is stored in, for example, the memory 170 (FIG. 3).

The foregoing processes of steps 801 through S817 may be performed periodically numerous times (e.g., thousands or millions of times) through the operating period of the aircraft 10 from initial start-up until shutdown of the aircraft 10. Thus, the non-member user device 150 may store a large amount of member user broadcast message data throughout the operational period of the aircraft 10. The data stored by the non-member user device may, either periodically or near the end of the operational period of the aircraft 10, be transmitted to the monitoring device 66. For example, in step S818, the avionics communication network 64, and more particularly, either or both of the controllers 84, 90, may connect with the monitoring device 66, where the connection may be, for example, via a satellite or other link while the aircraft 10 is enroute from one destination to another destination, or when the aircraft 10 has landed at a destination and a land-based link (e.g., a wifi connection) is established between the avionics communication network 64 and the monitoring device 66. That is, while the aircraft 10 is in flight, the avionics communication network 64 may continuously or periodically establish a satellite communication link with the monitoring device 66. This may be the case, for example, where a navigation system of the aircraft 10 may transmit global positioning data, altitude data, airspeed data, and/or ground speed data directly from the aircraft 10 to the monitoring device 66 while the aircraft 10 is in flight. The monitoring system 66 may then, for example, lot a position on a global map depicting the location of the aircraft 10. Alternatively, once the aircraft 10 lands, or as the aircraft 10 approaches the gate, the avionics communication network 64 may establish a wifi connection with the monitoring device 66.

Once the avionics communication network 64, or more particularly, the non-member user device 150, establishes the communication link with the monitoring device 66, in step S819, the monitoring program in the non-member user device 150 may determine whether it is time to transmit the stored digital data to the monitoring device 66. In step S819, the determination may be made by the monitoring program in the non-member user device 150 itself determining whether a predetermined period of time has elapsed since the last transmission of the digital data to the monitoring device 66. Alternatively, the determination may be made based on whether the aircraft 10 is approaching the gate. If the determination in step S819 is NO, then another determination may be made whether the monitoring program in the non-member user device 150 has received a request from the monitoring device 66 for the transmission of the digital data. That is, the monitoring program in the monitoring device 66 may instead broadcast a request message addressed to the avionics communication network 64 of the aircraft 10 for the non-member user device 150 to transmit the digital data to the monitoring device 66. If the determination is NO in step S820, then the flow returns to step S819 to wait for the next period for transmitting the digital data to be transmitted.

When either the determination in step S819 is YES, or the determination in step S820 is YES, then, in step S821, the non-member user device 150 organizes the digital data for transfer to the monitoring device 66. For example, the monitoring program in the non-member user device 150 may organize the digital data by each member user device, and organize the digital data for each member user device in chronological order based on the time that the digital data was stored. Of course, the digital data may be organized in any other manner instead. In step S822, the digital data is transferred from the non-member user device 150 to the monitoring device 66 (e.g., via the wireless interface 172 (FIG. 3) or the external interface 174 (FIG. 3)).

In step S823, the monitoring device 66 stores the digital data transferred from the non-member user device 150, and the monitoring program in the monitoring device 66 may then generate a monitored data report utilizing the stored digital data. The generated monitored data report may then be output in step S824. For example, a ground support user may select an option in the monitoring program to display engine data that is monitored by the engine control system 42. The monitoring program in the monitoring device 66 may then generate the monitored data report as display data that can be displayed on a computer screen and outputs the monitored data report to the display screen. Alternatively, the monitored data report may be printed out on a printer. At step S825, once the aircraft 10 is shutdown, the monitoring program may end.

Further aspects of the present disclosure are provided by the subject matter of the following clauses.

An aircraft monitoring system including an avionics communication network having an avionics communication bus structure installed on an aircraft, at least one network member user device connected to the avionics communication bus structure, the at least one network member user device transmitting a broadcast message onto the avionics communication bus structure, at least one non-member user device connected to the avionics communication bus structure, the at least one non-member user device receiving the broadcast message transmitted onto the avionics communication bus structure, processing the received broadcast message, and transmitting output data to a monitoring device, and the monitoring device that includes a central processing unit that receives the output data from the at least one non-member user device and outputs a monitored data report, wherein the at least one non-member user device includes, at least one bus interface that is connected to the avionics communication bus structure and receives the broadcast message transmitted onto the avionics communication bus structure by the at least one network member user device, a field programmable gate array (FPGA) that communicates with the at least one bus interface, and an output control circuit that communicates with the field programmable gate array, wherein the field programmable gate array is programmed to function as: a main finite state machine (FSM) that processes the broadcast message from the at least one bus interface, and a transfer finite state machine that generates output data and transfers the generated output data to the output control circuit.

The aircraft monitoring system according to the preceding clause, wherein the avionics communication bus structure is an avionics standard communication bus version C (ASCB-C) bus structure.

The aircraft monitoring system according to any preceding clause, wherein the avionics communication bus structure includes a first-side primary communication bus and a second-side primary communication bus.

The aircraft monitoring system according to any preceding clause, wherein the avionics communication bus structure further includes a first-side backup communication bus and a second-side backup communication bus.

The aircraft monitoring system according to any preceding clause, wherein the at least one network member user device includes a first-side network member user device and a second-side network member user device.

The aircraft monitoring system according to any preceding clause, wherein the first-side network member user device is configured to transmit messages onto and to receive messages from both the first-side primary communication bus and the first-side backup communication bus, and to receive messages from, but not transmit messages onto, the second-side primary communication bus, and the second-side network member user device is configured to transmit messages onto and to receive messages from both the second-side primary communication bus and the second-side backup communication bus, and to receive messages from, but not transmit messages onto, the first-side primary communication bus.

The aircraft monitoring system according to any preceding clause, wherein the at least one non-member user device is connected to the first-side primary communication bus, and is configured to receive messages transmitted onto the first-side primary communication bus by the first-side network member user device.

The aircraft monitoring system according to any preceding clause, wherein the at least one non-member user device further comprises a second bus interface that is connected to the second-side primary communication bus and receives messages transmitted onto the second-side primary communication bus by the second-side network member user device.

The aircraft monitoring system according to any preceding clause, wherein the second bus interface provides the received messages to the field programmable gate array.

The aircraft monitoring system according to any preceding clause, wherein the main finite state machine processes the broadcast message to transform the broadcast message into digital data, and the transfer finite state machine processes the digital data to generate a digital message.

The aircraft monitoring system according to any preceding clause, wherein the main finite state machine executes, to transform the broadcast message into the digital data: deserialization of the broadcast message, synchronization flag detection, zero insertion removal, cyclic redundancy check (CRC) calculation, flag/mark detection, and a CRC check.

The aircraft monitoring system according to any preceding clause, wherein the field programmable gate array is further programmed to function as: an edge detection device that provides an edge detection signal to the main FSM, a pre-CRC first-in-first-out (FIFO) device that receives the digital data from the main FSM and provides the digital data to the transfer FSM, and a main FIFO device that receives a digital message from the transfer FSM and outputs the digital message.

The aircraft monitoring system according to any preceding clause, wherein the FPGA is programmed to process the broadcast message transmitted onto the avionics communication bus structure by predetermined ones of the at least one network member user device.

The aircraft monitoring system according to any preceding clause, wherein the predetermined ones of the at least one network member user device includes an engine monitoring network member user device that transmits broadcast messages relating to engine operations of the aircraft.

The aircraft monitoring system according to any preceding clause, wherein the monitored data report provides operating characteristic information of at least one engine of the aircraft.

An engine health monitoring system for an engine of an aircraft, the engine health monitoring system including an avionics communication network that includes an avionics communication bus structure installed on the aircraft, at least one engine monitoring network member user device connected to the avionics communication bus structure, the at least one engine monitoring network member user device transmitting broadcast messages having engine data onto the avionics communication bus structure, at least one non-member engine monitoring user device connected to the avionics communication bus structure, the at least one non-member engine monitoring user device receiving the broadcast message having the engine data transmitted onto the avionics communication bus structure, processing the received broadcast message having the engine data, and transmitting output engine data to a monitoring device, and the monitoring device that includes a central processing unit that receives the output engine data from the at least one non-member engine monitoring user device and outputs a monitored engine data report, wherein the at least one non-member engine monitoring user device includes: at least one bus interface that is connected to the avionics communication bus structure and receives the broadcast message having the engine data transmitted onto the avionics communication bus structure by the at least one network member engine monitoring user device, a field programmable gate array (FPGA) that communicates with the at least one bus interface, and an output control circuit that communicates with the field programmable gate array, wherein the field programmable gate array is programmed to function as: a main finite state machine (MFSM) that processes the broadcast message having the engine data from the bus interface, and a transfer finite state machine (TFSM) that generates output engine data and transfers the generated output engine data to the output processor.

The engine health monitoring system according to the preceding clause, wherein the avionics communication bus structure is an avionics standard communication bus-version C (ASCB-C) bus structure.

The engine health monitoring system according to any preceding clause, wherein the main finite state machine processes the broadcast message having the engine data to transform the broadcast message having the engine data into digital engine data, and the transfer finite state machine processes the digital engine data to generate a digital message.

The engine health monitoring system according to any preceding clause, wherein the main finite state machine executes, to transform the broadcast message having the engine data into the digital engine data: deserialization of the broadcast message having the engine data, synchronization flag detection, zero insertion removal, cyclic redundancy check (CRC) calculation, flag/mark detection, and a CRC check.

The engine health monitoring system according to any preceding clause, wherein the field programmable gate array is further programmed to function as: an edge detection device that provides an edge detection signal to the main FSM, a pre-CRC first-in-first-out (FIFO) device that receives the digital engine data from the MFSM and provides the digital engine data to the TFSM, and a main FIFO device that receives digital message from the TFSM and outputs the digital message.

A non-member network user device connectable to an avionics communication bus structure, and connectable to a monitoring device, including at least one bus interface that is connectable to the avionics communication bus structure and configured to receive a broadcast message that is broadcast onto the avionics communication bus structure by at least one network member user device connected to the avionics communication bus structure, the broadcast message including data related to a system that is monitored by the at least one network member user device, a field programmable gate array (FPGA) that communicates with the at least one bus interface, and an output control circuit that communicates with the field programmable gate array and that is connectable with the monitoring device to communicate with the monitoring device, wherein the field programmable gate array is programmed to function as: a main finite state machine (MFSM) that processes the broadcast message having the data from the bus interface, and a transfer finite state machine (TFSM) that generates output data and transfers the generated output data to the output processing circuit.

The non-member network user device according to the preceding clause, wherein the avionics communication bus structure is an avionics standard communication bus-version C (ASCB-C) bus structure.

The non-member network user device according to any preceding clause, wherein the main finite state machine processes the broadcast message having the data to transform the broadcast message having the data into digital data, and the transfer finite state machine processes the digital data to generate a digital message.

The non-member network user device according to any preceding clause, wherein the main finite state machine executes, to transform the broadcast message having the data into the digital data: deserialization of the broadcast message having the data, synchronization flag detection, zero insertion removal, cyclic redundancy check (CRC) calculation, flag/mark detection, and a CRC check.

The non-member network user device according to any preceding clause, wherein the field programmable gate array is further programmed to function as: an edge detection device that provides an edge detection signal to the main FSM, a pre-CRC first-in-first-out (FIFO) device that receives the digital data from the MFSM and provides the digital data to the TFSM, and a main FIFO device that receives digital message from the TFSM and outputs the digital message.

A method for an aircraft monitoring system, the aircraft monitoring system including (i) an avionics communication network having (a) an avionics communication bus structure installed on an aircraft, (b) at least one bus controller, (c) at least one network member user device connected to the avionics communication bus structure, (d) at least one non-member user device connected to the avionics communication bus structure, and (e) a monitoring device that includes a central processing unit that receives data from the at least one non-member user device and outputs a monitored data report, wherein the at least one non-member user device includes a field programmable gate array (FPGA) programmed to function as: a main finite state machine (FSM), and a transfer finite state machine, the method including, (1) the at least one bus controller broadcasting a request message onto the avionics communication bus structure, (2) the at least one network member user device receiving the request message broadcast by the at least one controller, (3) the at least one member user device broadcasting a response message onto the avionics communication bus structure, (4) the at least one non-member user device receiving the broadcast response message transmitted onto the avionics communication bus structure by the member user device, (5) the FPGA of the least one non-member user device processing the received broadcast response message to generate digital data, (6) the non-member user device transmitting digital data to a monitoring device, and (7) the monitoring device receiving the digital data from the at least one non-member user device and outputting a monitored data report.

The method according to the preceding clause, wherein the avionics communication bus structure is an avionics standard communication bus version C (ASCB-C) bus structure.

The method according to any preceding clause, wherein the avionics communication bus structure includes a first-side primary communication bus and a second-side primary communication bus.

The method according to any preceding clause, wherein the avionics communication bus structure further includes a first-side backup communication bus and a second-side backup communication bus.

The method according to any preceding clause, wherein the at least one network member user device includes a first-side network member user device and a second-side network member user device.

The method according to any preceding clause, wherein the first-side network member user device is configured to transmit messages onto and to receive messages from both the first-side primary communication bus and the first-side backup communication bus, and to receive messages from, but not transmit messages onto, the second-side primary communication bus, and the second-side network member user device is configured to transmit messages onto and to receive messages from both the second-side primary communication bus and the second-side backup communication bus, and to receive messages from, but not transmit messages onto, the first-side primary communication bus.

The method according to any preceding clause, wherein the at least one non-member user device is connected to the first-side primary communication bus, and is configured to receive messages transmitted onto the first-side primary communication bus by the first-side network member user device.

The method according to any preceding clause, wherein the at least one non-member user device further comprises a second bus interface that is connected to the second-side primary communication bus and receives messages transmitted onto the second-side primary communication bus by the second-side network member user device.

The method according to any preceding clause, wherein the second bus interface provides the received messages to the field programmable gate array.

The method according to any preceding clause, wherein the main finite state machine processes the broadcast message to transform the broadcast message into digital data, and the transfer finite state machine processes the digital data to generate a digital message.

The method according to any preceding clause, wherein the main finite state machine executes, to transform the broadcast message into the digital data: deserialization of the broadcast message, synchronization flag detection, zero insertion removal, cyclic redundancy check (CRC) calculation, flag/mark detection, and a CRC check.

The method according to any preceding clause, wherein the field programmable gate array is further programmed to function as: an edge detection device that provides an edge detection signal to the main FSM, a pre-CRC first-in-first-out (FIFO) device that receives the digital data from the main FSM and provides the digital data to the transfer FSM, and a main FIFO device that receives a digital message from the transfer FSM and outputs the digital message.

The method according to any preceding clause, wherein the FPGA is programmed to process the broadcast message transmitted onto the avionics communication bus structure by predetermined ones of the at least one network member user device.

The method according to any preceding clause, wherein the predetermined ones of the at least one network member user device includes an engine monitoring network member user device that transmits broadcast messages relating to engine operations of the aircraft.

The method according to any preceding clause, wherein the monitored data report provides operating characteristic information of at least one engine of the aircraft.

Although the foregoing description is directed to some exemplary embodiments of the present disclosure, other variations and modifications will be apparent to those skilled in the art, and may be made without departing from the spirit or the scope of the disclosure. Moreover, features described in connection with one embodiment of the present disclosure may be used in conjunction with other embodiments, even if not explicitly stated above.

We claim:

1. A non-member network user device connectable to an avionics communication bus structure, and connectable to a monitoring device, comprising:
   at least one bus interface that is connectable to the avionics communication bus structure and configured to receive a broadcast message that is broadcast onto the avionics communication bus structure by at least one network member user device connected to the avionics communication bus structure, the broadcast message including data related to a system that is monitored by the at least one network member user device;
a field programmable gate array (FPGA) that communicates with the at least one bus interface; and
an output control circuit that communicates with the field programmable gate array and that is connectable with the monitoring device to communicate with the monitoring device,
wherein the field programmable gate array is programmed to function as:
a main finite state machine (MFSM) that processes the broadcast message having the data from the at least one bus interface, and
a transfer finite state machine (TFSM) that generates output data and transfers the generated output data to an output processing circuit.

2. The non-member network user device according to claim 1, wherein the avionics communication bus structure is an avionics standard communication bus-version C (ASCB-C) bus structure.

3. The non-member network user device according to claim 2, wherein the main finite state machine processes the broadcast message having the data to transform the broadcast message having the data into digital data, and the transfer finite state machine processes the digital data to generate a digital message.

4. The non-member network user device according to claim 3, wherein the main finite state machine executes, to transform the broadcast message having the data into the digital data:
deserialization of the broadcast message having the data;
synchronization flag detection;
zero insertion removal;
cyclic redundancy check (CRC) calculation;
flag/mark detection; and
a CRC check.

5. The non-member network user device according to claim 4, wherein the field programmable gate array is further programmed to function as:
an edge detection device that provides an edge detection signal to the MFSM;
a pre-CRC first-in-first-out (FIFO) device that receives the digital data from the MFSM and provides the digital data to the TFSM; and
a main FIFO device that receives digital message from the TFSM and outputs the digital message.

* * * * *